United States Patent
Wu

(10) Patent No.: US 6,378,794 B1
(45) Date of Patent: Apr. 30, 2002

(54) GRINDING ASSEMBLY OF A PEPPER GRINDER

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/438,777

(22) Filed: Nov. 12, 1999

(51) Int. Cl.⁷ .................................................. A47J 42/00
(52) U.S. Cl. ..................................... 241/168; 241/169.1
(58) Field of Search .............................. 241/168, 169.1, 241/100, 259.1; 222/142.1–142.47

(56) References Cited

U.S. PATENT DOCUMENTS

| | | | | |
|---|---|---|---|---|
| 3,130,927 A | * | 4/1964 | Schmieding | 241/169.1 |
| 3,136,491 A | * | 6/1964 | Posmanter | 241/169.1 |
| 4,685,627 A | * | 8/1987 | Lee | 241/169.1 |
| 4,771,954 A | * | 9/1988 | Poncy | 241/169.1 |
| 4,771,955 A | * | 9/1988 | Paulson | 241/169.1 |
| 4,865,258 A | * | 9/1989 | Smith et al. | 241/169.1 |
| 5,785,264 A | * | 7/1998 | Yang | 241/169.1 |
| 5,897,067 A | * | 4/1999 | Tardif et al. | 241/169.1 |

* cited by examiner

Primary Examiner—John M. Husar
(74) Attorney, Agent, or Firm—Rosenberg, Klein & Lee

(57) ABSTRACT

A grinding assembly of a pepper grinder has an inner and an outer grinding members. The inner grinding member is turnably received in the outer member. The inner member has grinding teeth on an outer side thereof, opposing grinding teeth of an inner side of the outer member. The inner member grinding teeth are not in touch with the outer member grinding teeth. The inner member further has a lower end annular part touching lower ends of the outer member grinding teeth. Because the grinding teeth do not touch each other, the inner grinding member can be turned more smoothly.

1 Claim, 4 Drawing Sheets

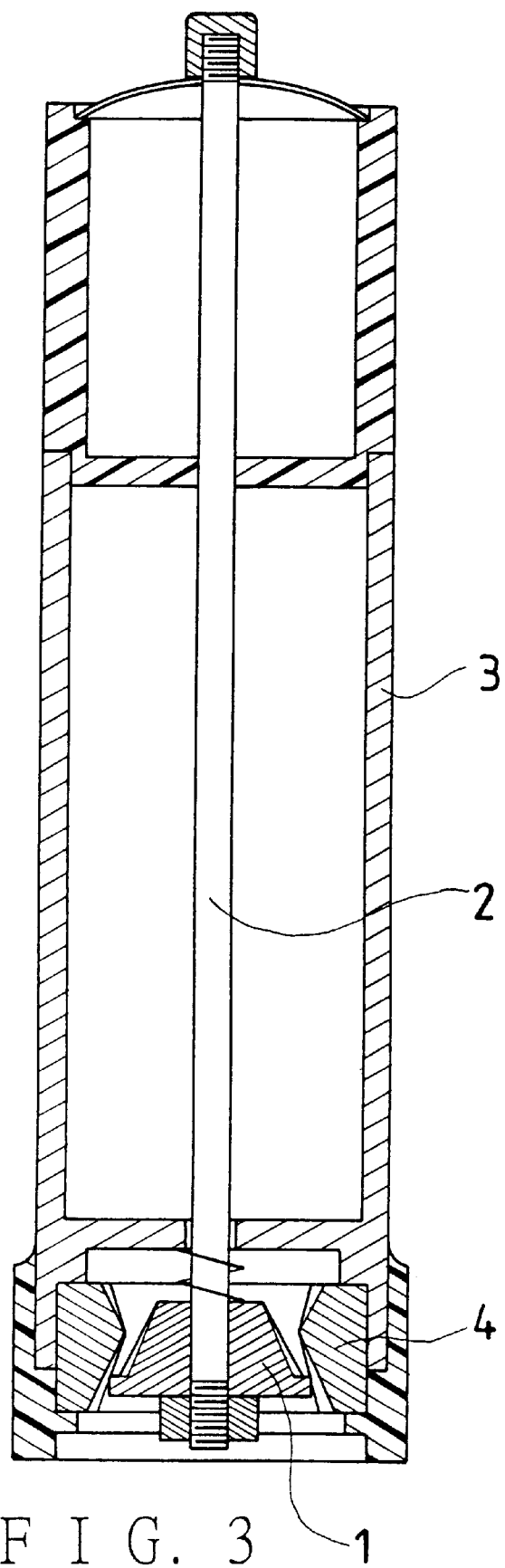
F I G. 3

GRINDING ASSEMBLY OF A PEPPER GRINDER

BACKGROUND OF THE INVENTION

The present invention relates to a pepper grinder. Particularly, the invention is directed to a grinding assembly of the pepper grinder.

Referring to FIGS. 4, 5 and 6, a heretofore known grinding assembly of pepper grinder comprises an outer grinding member 20 and an inner grinding member 40. The outer grinding member 20 has grinding teeth 201 on inner side thereof. The inner grinding member 40 has grinding teeth 401 on an outer side thereof, and has a central square hole (not numbered) for same to be connected to a shaft of a transmission assembly.

The inner grinding member 40 is received within the outer grinding member 20 with the grinding teeth 401 opposing the grinding teeth 201. Pepper is ground into smaller particulates between the grinding members 20, 40 by the grinding teeth 201, 401 when the inner grinding member 40 is turned relative to the outer grinding member 20.

However, referring specifically to FIG. 5, the lower portions of both the grinding teeth 201, 401 are touching so the friction and engagement between the grinding teeth lower portions make the inner grinding member 40 unable to turn smoothly. Moreover, the touch between the lower portion is likely to make metal chippings and shavings come off the grinding teeth 201, 401, and the grinding teeth collapsed. When the metal chippings and shavings are mixed with the pepper particulates and eaten by people who take the pepper, it might lead to health problem of the eaten.

SUMMARY OF THE INVENTION

Therefore, it is a main object of the present invention to provide a grinding assembly for a pepper grinder, which would overcome the disadvantages of the prior art one.

The grinding assembly of a pepper grinder comprises an inner grinding member and an outer grinding member.

The inner grinding member has grinding teeth on an outer side thereof, and is turnably received in the outer member.

The outer member has grinding teeth on an inner side thereof, opposing the inner member grinding teeth; the inner member teeth are not in touch with the outer member grinding teeth.

The inner grinding member further has an annular part on a lower end portion thereof, the annular part is arranged below, and in touch with, the outer member grinding teeth.

Because the grinding teeth do not touch each other, the inner grinding member can be turned more smoothly to grind pepper. And, it is less likely that the grinding teeth get collapsed.

BRIEF DESCRIPTION OF THE DRAWINGS

The present invention will be better understood by reference to the accompanying drawings, wherein:

FIG. 3 is a cross-sectional view of the pepper grinder with the grinding assembly in FIG. 1.

DETAILED DESCRIPTION OF THE PREFERRED EMBODIMENTS

Figure 2:
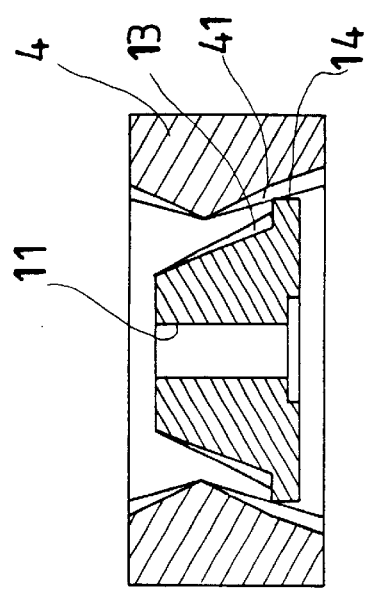
FIG. 2 is a cross-sectional view of the grinding assembly of a pepper grinder in FIG. 1.
Figure 1:
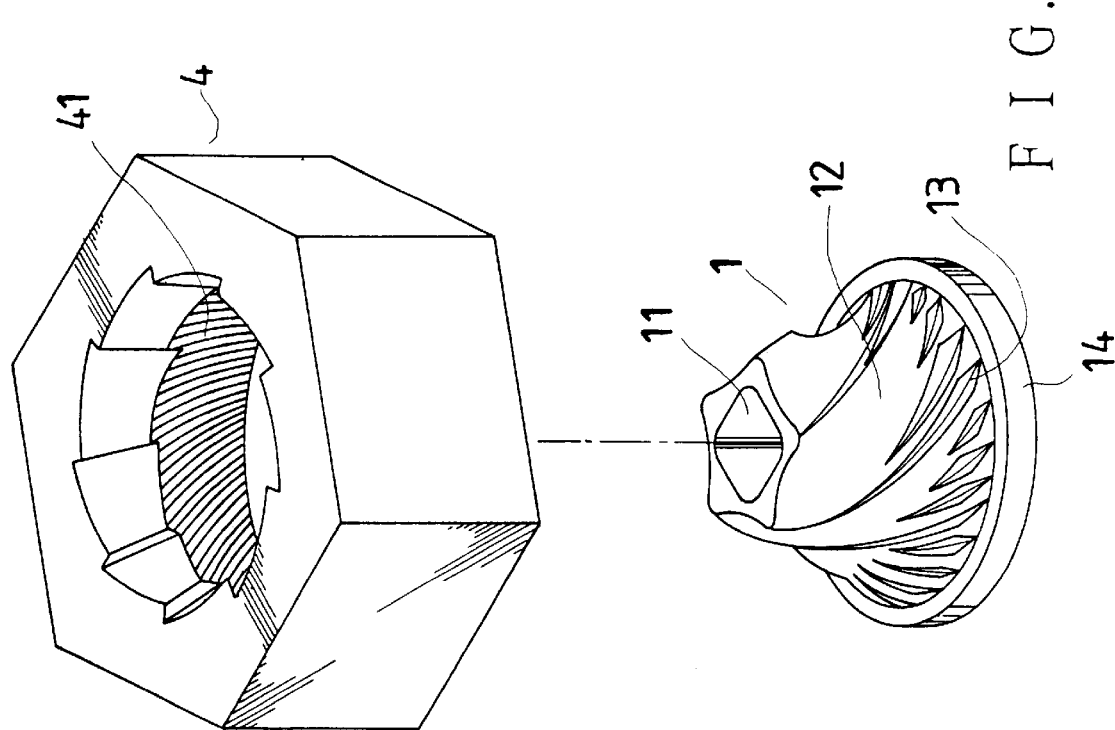
FIG. 1 is an exploded perspective view of a grinding assembly of a pepper grinder of the present invention.
Figures 4, 5:
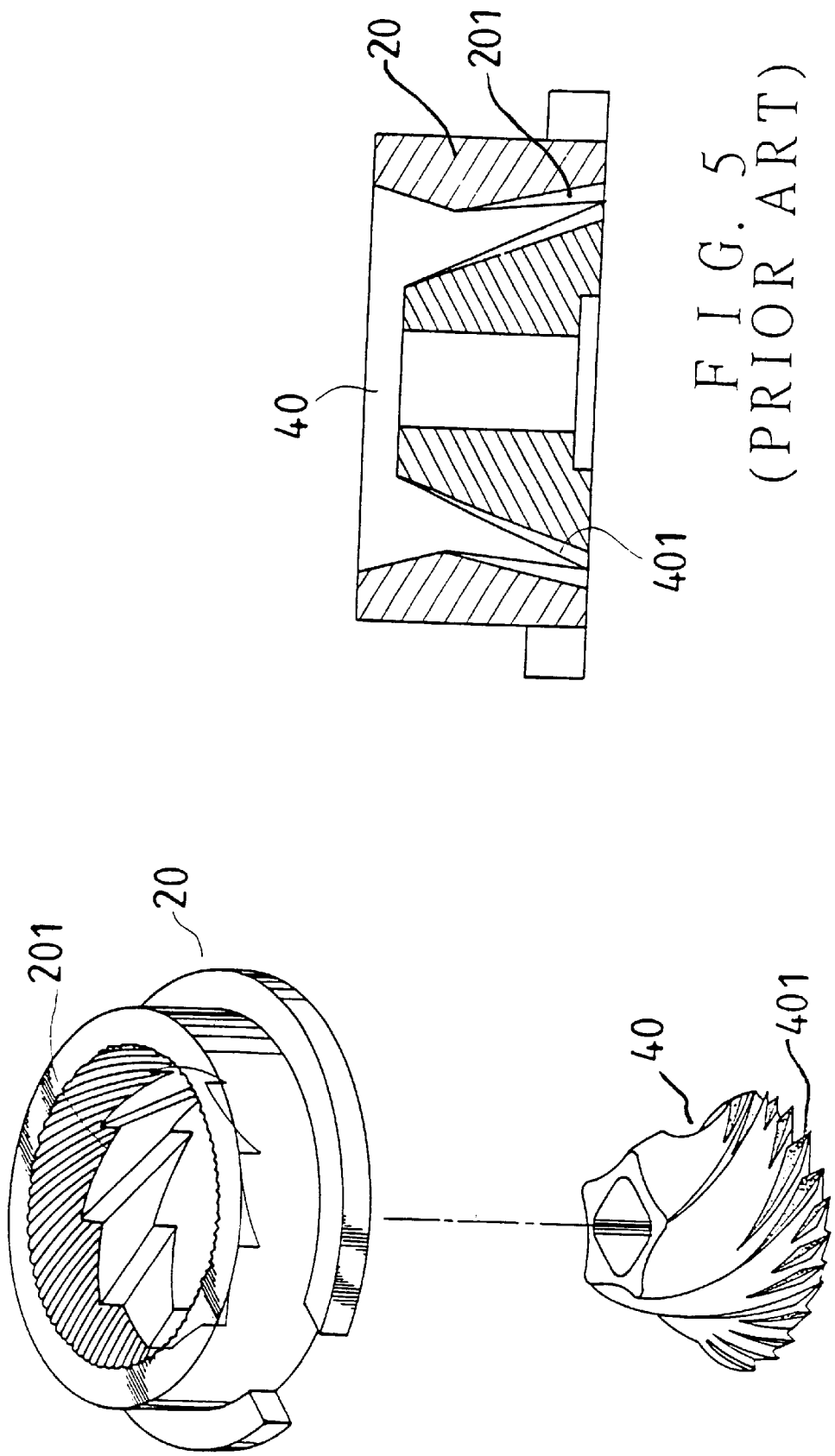
FIG. 4 is an exploded perspective view of a prior art grinding assembly as described in the Background.
FIG. 5 is a cross-sectional view of the prior art grinding assembly in FIG. 4.
Figure 6:
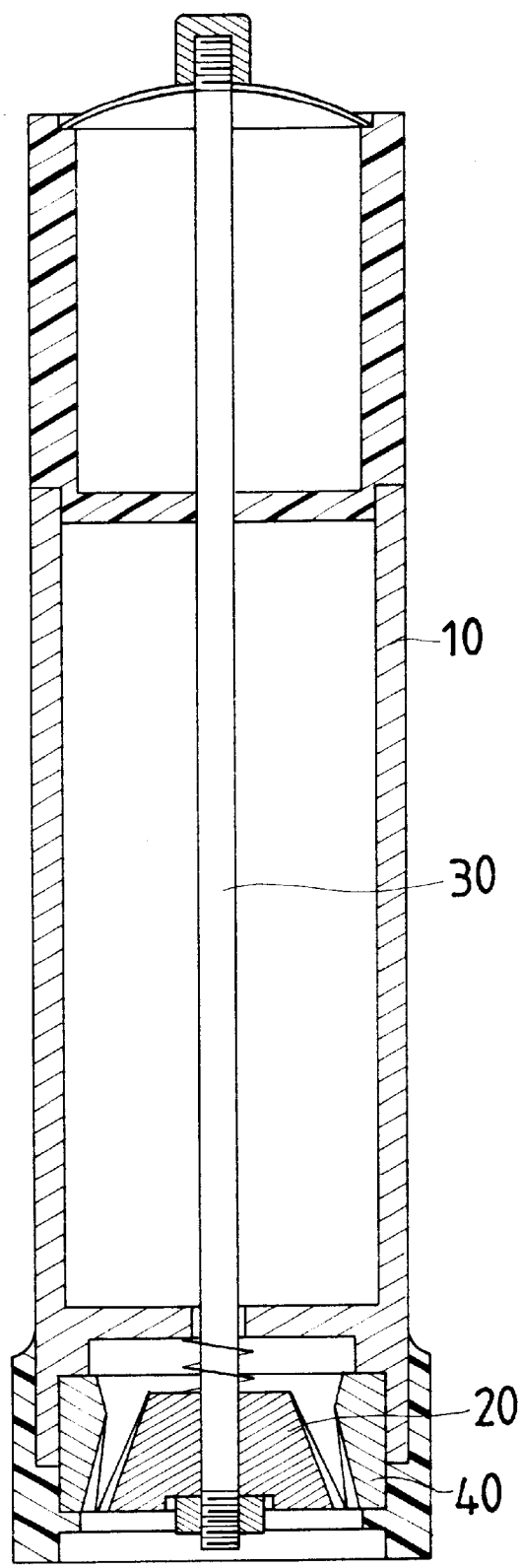
FIG. 6 is a cross-sectional view of the prior art pepper grinder with the grinding assembly in FIG. 4.

Referring to FIGS. 1, 2 and 3, a grinding assembly of a pepper grinder of the present invention comprises an inner grinding member 1 and an outer grinding member 4.

The inner grinding member 1 has a central square hole 11, guide trenches 12, grinding teeth 13 and an annular part 14. The grinding teeth 13 are provided between every two adjacent guide trenches 12. The square hole 11 is provided for the inner grinding member 1 to be connected to a shaft 2 of a transmission assembly. The transmission is not the subject of the present invention so it is not detailed herein. The annular part 14 is provided on a lower end portion of the inner grinding member 1.

The outer grinding member 4 has grinding teeth 41 on an inner side thereof. The outer grinding member 4 houses the inner grinding member 1 therein with the grinding teeth 41 opposing the grinding teeth 13. Annular part 14 of the inner grinding member 1 touches the lower end of the grinding teeth 41 of the outer grinding member 4, while the grinding teeth 41 and 13 do not touch each other.

When pepper is disposed between the grinding members 1 and 4, the pepper will slide down along the guide trenches 12 to the grinding teeth 13 and 41. The inner grinding member 1 is turned to grind the pepper into smaller particulates; the pepper particulates are dispensed to people through the space between the grinding teeth 41 and the annular part 14.

From the above description, the grinding assembly can be known to have advantages as follows.

1. The inner grinding member can be turned relatively smoothly because the grinding teeth 41, 13 do not touch each other.
2. Therefore, the grinding teeth are not likely to collapse, and there would be no metal chipping and shavings coming off the grinding teeth to endanger the health of consumer.

What is claimed is:

1. A grinding assembly of a pepper grinder comprising:
   an outer grinding member having a first through passage extending therethrough, said first through passage defining an inner surface of said outer grinding member, said inner surface having a first set of grinding teeth formed thereon;
   an inner grinding member having a second through passage extending therethrough, said second through passage having a substantially square shaped cross-section for receiving a grinding shaft, said inner grinding member having an outer surface and a lower end, said lower end having an annular rim formed thereon, said outer surface having a plurality of guide trenches and a second set of grinding teeth formed thereon, said second set of grinding teeth forming boundaries between adjacent pairs of said guide trenches, said inner grinding member being rotatably received within said first through passage of said outer grinding member, said second set of grinding teeth being spaced apart from said first set of grinding teeth, said annular rim contiguous said first set of grinding teeth, whereby said inner surface of said outer grinding member, said outer surface of said inner grinding member, and said annular rim form a cavity for grinding pepper between said first and second sets of grinding teeth when said shaft is rotated.

* * * * *